(12) United States Patent
Smith et al.

(10) Patent No.: US 11,816,701 B2
(45) Date of Patent: Nov. 14, 2023

(54) TECHNIQUES FOR TARGETING A USER BASED ON A PSYCHOGRAPHIC PROFILE

(71) Applicant: Adobe Inc., San Jose, CA (US)

(72) Inventors: Kevin G. Smith, Lehi, UT (US); J. Scott Wellwood, San Mateo, CA (US); Brandon Hartness, Draper, UT (US); Craig Mathis, American Fork, UT (US)

(73) Assignee: Adobe Inc., San Jose, CA (US)

( * ) Notice: Subject to any disclaimer, the term of this patent is extended or adjusted under 35 U.S.C. 154(b) by 717 days.

(21) Appl. No.: 15/040,653

(22) Filed: Feb. 10, 2016

(65) Prior Publication Data
US 2017/0228790 A1  Aug. 10, 2017

(51) Int. Cl.
*G06Q 30/00* (2023.01)
*G06Q 30/0251* (2023.01)

(52) U.S. Cl.
CPC .............. *G06Q 30/0269* (2013.01)

(58) Field of Classification Search
None
See application file for complete search history.

(56) References Cited

U.S. PATENT DOCUMENTS

| | | | | |
|---|---|---|---|---|
| 5,848,396 A * | 12/1998 | Gerace | ............... | G06Q 30/0251 705/14.49 |
| 6,757,691 B1 * | 6/2004 | Welsh | ............... | H04N 21/4826 348/E7.071 |
| 7,181,438 B1 * | 2/2007 | Szabo | ............... | G06F 21/6245 |
| 8,527,869 B2 * | 9/2013 | Hosea | ............... | G06Q 10/06375 707/732 |
| 9,176,966 B2 * | 11/2015 | Silverstein | ............... | G06F 16/116 |

(Continued)

FOREIGN PATENT DOCUMENTS

| | | | |
|---|---|---|---|
| EP | 0895685 B1 * | 10/1999 | |
| WO | WO-9741673 A2 * | 11/1997 | ............. G06Q 30/02 |

(Continued)

OTHER PUBLICATIONS

Dutta-Bergman, Mohan J. "The demographic and psychographic antecedents of attitude toward advertising." Journal of Advertising Research 46.1 (2006): 102-112. (Year: 2006).*

(Continued)

*Primary Examiner* — Michael Bekerman
(74) *Attorney, Agent, or Firm* — Kilpatrick Townsend & Stockton LLP

(57) ABSTRACT

This disclosure relates to providing content (e.g., marketing content) to an individual based on a psychographic profile of an individual. The method includes obtaining a psychographic profile of an individual. The psychographic profile comprises one or more psychographic dimensions associated with the first individual and a psychographic profile group. A psychographic dimension corresponds to at least one of an interest, an attitude, an opinion, a value, a behavior, or an activity of the individual. Content (e.g., marketing content) is received, the content being associated with a psychographic profile group corresponding to the psychographic profile of the individual. The content is provided to the individual based on the associated psychographic profile group of the content and the associated psychographic profile group of the individual.

16 Claims, 9 Drawing Sheets

(56) References Cited

U.S. PATENT DOCUMENTS

| | | | |
|---|---|---|---|
| 9,317,566 | B1 | 4/2016 | L'Huillier |
| 2007/0067297 | A1* | 3/2007 | Kublickis ............... G06Q 30/02 |
| 2008/0065471 | A1 | 3/2008 | Reynolds |
| 2008/0199042 | A1* | 8/2008 | Smith .................... G06Q 30/02 382/100 |
| 2008/0249867 | A1 | 10/2008 | Angell |
| 2009/0006206 | A1* | 1/2009 | Groe ................. G06Q 30/0255 705/14.69 |
| 2009/0112701 | A1* | 4/2009 | Turpin ................... G06Q 30/02 705/7.33 |
| 2011/0099133 | A1 | 4/2011 | Chang et al. |
| 2011/0119125 | A1* | 5/2011 | Javangula .............. G06Q 30/02 705/14.43 |
| 2012/0316916 | A1 | 12/2012 | Andrews et al. |
| 2013/0231974 | A1 | 9/2013 | Harris |
| 2014/0244359 | A1 | 8/2014 | Haber et al. |
| 2014/0244398 | A1* | 8/2014 | Wasilewski ........ G06Q 30/0269 705/14.66 |
| 2016/0189173 | A1 | 6/2016 | King et al. |
| 2016/0203498 | A1 | 7/2016 | Das et al. |
| 2016/0232599 | A1* | 8/2016 | Adrian ............... G06Q 30/0251 |
| 2017/0052971 | A1 | 2/2017 | Boyer et al. |
| 2017/0140429 | A1 | 5/2017 | Cheng et al. |

FOREIGN PATENT DOCUMENTS

| | | | | |
|---|---|---|---|---|
| WO | WO-2005003899 | A2 * | 1/2005 | ........... G06Q 20/123 |
| WO | WO-2015065314 | A1 * | 5/2015 | ......... G06Q 30/0641 |

OTHER PUBLICATIONS

Notice of Allowance from related U.S. Appl. No. 15/070,823 dated Sep. 2, 2020, 11 pages.

Allport, Gordon W., et al., "Trait-Names: A Psycho-Lexical Study", Psychological Monographs, vol. 47, No. 1, 1936, 177 pages.

Kanokwan, Atchariyachanvanich, et al., "What Keeps Online Customers Repurchasing Through The Internet", ACM SIGecom Exchanges, 6(2), Jan. 2007, 11 pages.

Babin, Barry, et al., "Work And/Or Fun: Measuring Hedonic And Utilitarian Shopping Value", Journal of Consumer Research, , vol. 20, Issue 4, Mar. 1994, 2 pages.

Digman, John, M., "Personality Structure: Emergence of the Five-Factor Model", Annual Review of Psychology, 41, 1990, 24 pages.

DISC Profile , "DISC style in Sales", https://www.discprofiles.com/blog/2014/05/disc-styles-sales/, May 2014, 4 pages.

EMarketer, "APAC Marketers Challenged to Find The Right Audience", https://www.emarketer.com/Article/APAC-Marketers-Challenged-Find-Right-Audience/1012493, May 18, 2015, accessed Aug. 19, 2019, 2 pages.

John, Oliver P., et al., "Paradigm shift to the integrative big five trait taxonomy", Handbook of personality: Theory and Research, $3^{rd}$ Edition, Jan. 2008.

Kau, Ah Kend, et al., "Typology Of Online Shoppers" Journal of Consumer Marketing, 20(2), 2003, 18 pages.

Kim, Jae-Il, et al., "Factors Affecting Online Search Intention And Online Purchase Intention", Seoul Journal of Business, vol. 10, No. 2 Dec. 2004, 27 pages.

Mowen, John C., et al., "Toward A Theory Of Motivation And Personality With Application To Word-Of-Mouth Communications", Journal Of Business Research, 60(6), 2007, 7 pages.

Pennebaker, James W., et al., "Linguistic Styles: Language Use As An Individual Difference". Journal Of Personality And Social Psychology, 77(6), Dec. 1999.

Rain Group, "The Eight Buyer Personas and How to Sell to Them", https://www.rainsalestraining.com/blog/the-8-buyerpersonas-and-how-to-sell-to-them, 2011, accessed Aug. 18, 2019, 6 pages.

* cited by examiner

| Group | Description | Associated Dimension |
|---|---|---|
| Socially Conscious | Materialistic, acquisitive person who is driven by other's perceptions of them rather than by their own values. Responds to appearance, persona, charisma, and fashion. Attractive packaging is often as important as contents. They are interested in gaining status. | D1 > 50 |
| Mainstream | A person who lives in the world of the domestic and everyday. A daily routine is fundamental to the way they live their lives. Life choices focus on "we" rather than "me." Respond highly to established brands, to "family" brands and to offers of value for money. They are interested in security. | D2 > 60 |
| Leader | Values their own independent judgement. Mostly anti-materialistic and intelligent. Socially aware and pride themselves on tolerance. Seek out the authentic and the harmonious, and are often at the leading edge of society. Will not purchase something just because it's new. | D3 > 45 |
| Ambitious | Possess self-confidence, have strong goal orientation and tend to be very organized. Their investment in the status quo means they tend to support it. When it comes to brands, they seek reward and prestige, and will often seek out the best, because that is what they feel they deserve. They also seek out caring and protective brands. They are interested in maintaining control. | D4 > 70 |
| Elderly | Associated with constant, unchanging values built over time. For them, the past is bathed in a warm nostalgic glow. They respect institutions and enjoy acting in traditional roles. Their brand choices are driven by a need for safety and economy. They choose above all what is familiar to them. | D9 > 60 and D10 < 30 |
| Explorer | People who are driven by a need for discovery, challenge, and new frontiers. Young in nature, if not in reality, explorers are often the first to try out new ideas and experiences. They respond to brands that offer new sensations, indulgence, and instant effects. In short, difference is what an explorer seeks. | D5 and D6 > 80 |

FIG. 3

```
402
CONTENT SPECIFICATION
{
    CONTENT IDENTIFIER = "AD 1"
    PSYCHOGRAPHIC DIMENSION D1 = "90"
    PSYCHOGRAPHIC DIMENSION D4 = "80"
    PSYCHOGRAPHIC DIMENSION D5 = "75"
    PSYCHOGRAPHIC GROUP = "LEADER"
    COLOR SCHEME = "MUTED"
    FONT = "ARIAL NARROW"
    IMAGE = "CAR-IN-CITY.jpg."
    MESSAGE = "ACME NOVELLA, SIMPLY AMAZING."
}
```

FIG. 4A

```
404
CONTENT SPECIFICATION
{
    CONTENT IDENTIFIER = "AD 2"
    PSYCHOGRAPHIC DIMENSION D1 = "90"
    PSYCHOGRAPHIC DIMENSION D6 = "90"
    PSYCHOGRAPHIC DIMENSION D4 = "40"
    PSYCHOGRAPHIC GROUP = "EXPLORER"
    COLOR SCHEME = "BRIGHT"
    FONT = "CALIBRI"
    IMAGE = "CAR-ON-MOUNTAIN.jpg."
    MESSAGE = "ACME NOVELLA, BUILT FOR ALL YOUR
ADVENTURES."
}
```

```
                                ┌─ 502
TEMPLATE
{
    PSYCHOGRAPHIC GROUP IDENTIFIER = "EXPLORER"
    COLOR SCHEME = "BLUES AND GREENS"
    FONT = "CALIBRI"
    PRODUCT IDENTIFIER = "ACME NOVELLA LX"
    IMAGE = "CAR-ON-MOUNTAIN.jpg."
    MESSAGE = "ACME NOVELLA, BUILT FOR ALL OF YOUR
ADVENTURES."
}
```

FIG. 5A

```
                                ┌─ 504
TEMPLATE
{
    PSYCHOGRAPHIC DIMENSION D1 = "90"
    PSYCHOGRAPHIC DIMENSION D4 = "80"
    COLOR SCHEME = "FRESH"
    FONT = "CALIBRI"
    PRODUCT IDENTIFIER = "ACME NOVELLA LIMITED"
    IMAGE = "CAR-IN-BIG-TREE.jpg."
    MESSAGE = "ACME NOVELLA, ONE WITH NATURE."
}
```

FIG. 5B

TECHNIQUES FOR TARGETING A USER BASED ON A PSYCHOGRAPHIC PROFILE

TECHNICAL FIELD

This disclosure relates generally to computer-implemented methods and systems that provide content based on a psychographic profile of an individual.

BACKGROUND

Marketers typically want to portray a targeted and personalized experience with a high degree of accuracy to those viewing advertisements and online content. Digital targeting provides tools for customizing the layout, contents, products, and overall experience to the individual viewing an ad. In order to accomplish this, the marketer and the tools they use need to know something about the individual. Marketers currently build online profiles for each individual based on the individual's online activities, preferences and behaviors. Using this information, a targeting tool can determine the best product to show the user based on the current context. However, the personalization is limited to the degree to which the system knows the user. Current behavioral targeting and personalization determine the best product or product category to show a user based on this profile.

However, leading an individual to the decision to purchase an item, respond to advertising content, or perform some other task is often more involved than simply delivering the experience. Once the correct item or goal has been selected, there are many ways to portray that experience and people who already have an inclination towards the item will respond differently based at least in part on how the experience was presented to them. Some marketers have removed people and personality completely from their ads rather than portray the experience with connotations that may work for some individuals but not for others, in the hopes that the viewer will cast their own personality on the subject. While this may perform better than providing content that is contrary to the disposition of the user, it does not perform as well as providing content that is focused on the disposition of the user. Although the marketer loses the opportunity to speak directly to the disposition of the user, the marketer also avoids the possibility of convincing those with different inclinations that the product is not for them.

For example, with existing targeting tools, a marketer (e.g., a bank) determines that a young, married couple is likely to be in the market for a mortgage loan. One spouse views the mortgage as an investment and is interested in point discounts and the ability to quickly build equity and appreciation. The other spouse is interested in the security that a mortgage will provide the family and the pride of ownership. Given the availability of current technology, the marketer is challenged to determine what type of advertisement to display with no insight into these interests. Showing a mortgage advertisement that reinforces mortgage security will appeal to the spouse who is interested in security, but would not be alluring to the spouse who is interested in the investment. Thus, the marketer often removes people and personality from the advertisement completely and focuses on the rates, thereby neither appealing to nor dissuading either party.

SUMMARY

As discussed above, marketers currently lack the ability to provide targeted marketing content to an individual that takes into account the individual's values and interests. Traditionally, marketers utilize demographic information that focuses on everyday facts, like the person's age or gender. In contrast, psychographic dimensions focus on the interests, attitudes, opinions, values, behavior and activities of the person. Accordingly, these dimensions are invaluable in identifying factors that influence a person's behavior, specifically their shopping behavior, as they provide insight into the motivations behind the person's purchase decisions. By utilizing one or more psychographic dimensions (e.g., associated with a psychographic profile), the marketer is enabled to add color and connotation to product displays and advertisements by ensuring that they will match the personality of the user. According to certain embodiments, systems and methods are disclosed for providing marketing content based on a psychographic profile of an individual.

In some embodiments, marketing content associated with a psychographic dimension is received. A psychographic profile of the individual is obtained. The psychographic profile comprises one or more psychographic dimensions associated with the individual. A psychographic dimension corresponds to at least one of an interest, an attitude, an opinion, a value, a behavior, or an activity of the individual. It is determined that the psychographic dimension associated with the marketing content corresponds with one or more psychographic dimensions of the psychographic profile of the individual. The marketing content is provided to the individual based on the determination.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings, where:

FIG. 3 is an example chart that depicts a number of example psychographic groups, according to certain exemplary embodiments of the content management engine;

FIGS. 4A and 4B depict example content specifications, according to certain exemplary embodiments of the content management engine;

FIGS. 5A and 5B depict example marketing templates, according to certain exemplary embodiments of the content management engine;

DETAILED DESCRIPTION

Figure 1:
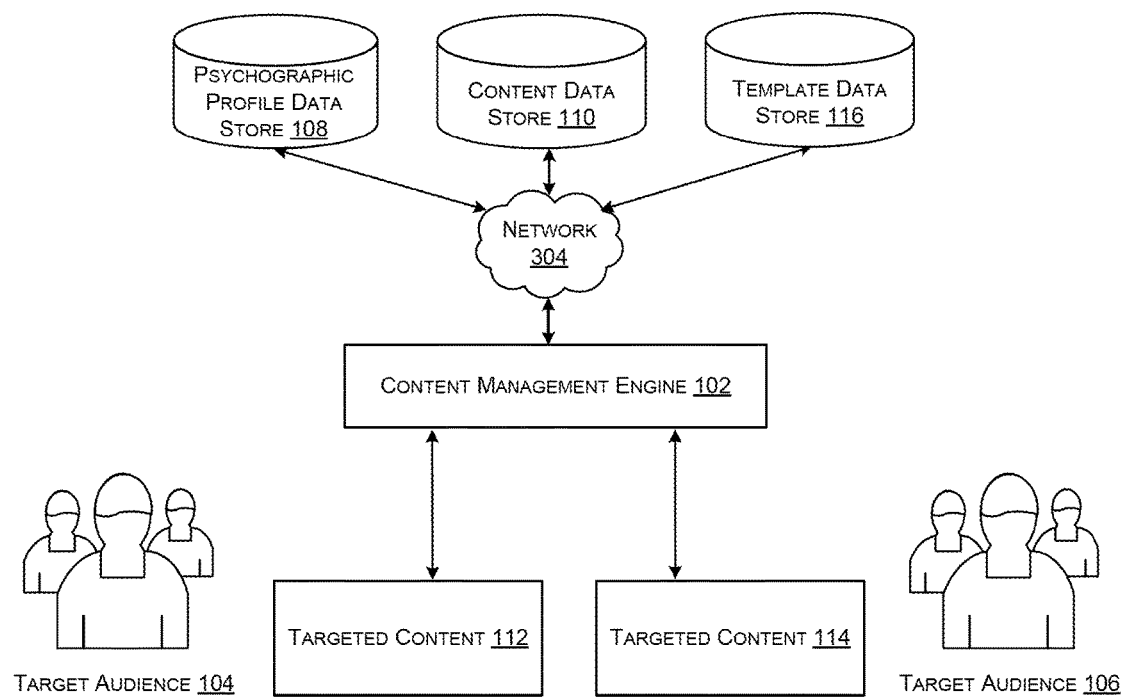
FIG. 1 is a block diagram depicting an example of a content management engine that provides targeted content to multiple targeted audiences based on psychographic profiles, according to certain exemplary embodiments.

According to certain embodiments, systems and methods are disclosed for targeting marketing content to a person based on a psychographic profile of the person. A "psychographic profile" of a person includes any suitable number of psychographic dimensions. As used herein, a "psychographic dimension" corresponds to a value that quantifies an interest, attitude, opinion, and/or values, of a person.

At least one embodiment of the invention includes a method for providing marketing content to a person based on a psychographic profile of the person. As a non-limiting example, a person's psychographic profile indicates that the person is highly ambitious, rejects mainstream fashions, values financial independence, has a large social network, suffers high amounts of anxiety, often purchases electronics of a particular brand, enjoys particular musical artists, and the like. These observations are individually associated with separate psychographic dimensions of the person.

A psychographic profile (e.g., a collection of one or more psychographic dimensions) for a person is derived using various online data. Some information that is utilized to ascertain different psychographic dimensions of the person includes, but is not limited to, textual-input data, clickstream data, past-purchase information, survey-response data, and the like. "Textual input data," includes electronic communications submitted by the person (e.g., social media posts, product reviews, blogs, articles, papers, email messages, text messages, etc.). "Clickstream data," refers to information related to what webpages a person visits, how long he remains on a web page, hyperlinks selected, and generally any information related to a succession of selections made by the person (e.g., mouse clicks, touch selections, etc.). "Past-purchase information," include data indicating a number of purchases completed by a person as well as data identifying the purchased items. "Survey-response data," refers to responses provided by a person in response to one or more questionnaires.

In a non-limiting example, a psychographic profile, or a set of psychographic dimensions of a person's psychographic profile, indicate that the user belongs to a particular psychographic group. A psychographic group corresponds to one or more common psychographic dimensions shared by one or more individuals. Example psychographic groups include, but are not limited to a "conscious consumer," a "new family," a "type A individual," a "beta tester," a "community organizer," an "indulgent," a "socially conscious individual," a "mainstreamer," a "leader," an "ambitious individual," an "elderly individual," an "explorer," to name a few. Certain traits are associated with a psychographic group. For example, conscious consumers are known to be a diverse group that collectively believe in and support the sustainability of life on Earth through buying decisions. Type A individuals typically know exactly what they want, and will spend extra, painstaking time to get what they want (e.g., reading articles about a product, clipping coupons, etc.). A person belonging to the "indulgent" group needs to splurge once in a while to maintain an even life balance. It should be understood that many and various psychographic groups exist and any number of psychographic dimensions of a person's psychographic profile pertain to the psychographic group.

In at least one embodiment of the invention, marketing content (e.g., an advertisement, a marketing email, etc.) is received. The marketing content, in some examples, is associated with one or more psychographic dimensions and/or one or more psychographic groups. A number of users (e.g., potential audience members) are selected from a pool. The psychographic profiles of the users is analyzed to determine individuals that share a psychographic dimension and/or group with the marketing content. These individuals (or a subset of these individuals) are then presented the marketing content.

In a non-limiting example, potential audience members includes person A and person B. Person A is associated with a psychographic profile that indicates that person A is a type A personality. Person B is associated with a psychographic profile indicating that person B enjoys the great outdoors. Marketing content is received by the system. In this example, the system receives multiple instances of marketing content including a number of advertisements for a four-door sedan. In one advertisement, the four-door sedan is presented in a urban context. The color scheme includes muted metallic tones that provide a modern, minimalistic representation of the vehicle. The advertisement is associated with a psychographic dimension and/or group. For example, the advertisement is associated with minimalists, individuals who appreciate modern styles, and/or type A personalities. Another advertisement depicts the four-door sedan as being mud-crusted, and traveling through a mountainous region. A dog is presented as hanging out the window. This advertisement is associated with a different psychographic dimension and/or group than the first advertisement. Namely, this advertisement is associated with adventurers, do-it-yourselfers, and/or fitness-conscious individuals. Accordingly, person A is identified as a potential audience for the minimalist advertisement based on the associated psychographic dimensions/groups of the advertisement and the psychographic profile of person A. Similarly, person B is identified as a potential audience for the adventurous advertisement based on the psychographic dimensions/groups associated with that advertisement and the psychographic profile of person B.

Several benefits are realized by utilizing the process described above, although the following benefits are not intended to be an exhaustive list. For example, matching marketing content to a psychographic profile of a user provides marketing content to individuals that are most likely to find the content appealing. Providing content based on demographics alone tend to provide, for example, advertisements to a 25-year-old man that relate to a particular product because it is known that many 25-year-olds purchase that product. However, these techniques do not delve into the degree of granularity of what is known about the user. By utilizing a psychographic profile, more is identifiable that merely that the user may be interested in the product, but even further, how the product is to be presented to the user in order to maximize the likelihood that the user purchases the product. As described in the example above, the marketer is enabled to provide the exact same product in different lights so as to more accurately appeal to each person by personalizing the content according to the psychographic profile of each person. Thus, by using psychographic profiles to select and/or alter content, a marketer increases profits by more accurately targeting an audience who is most likely to be positively influenced by the provided content. Additionally, the marketer minimizes the chances of providing the content to an individual who would find the content unappealing.

Although examples will be discussed throughout this disclosure in the context of providing marketing content, the opportunities presented by selecting and altering content based on a psychographic profile are numerous. For instance, psychographic profiles are similarly applicable with respect to email remarketing to ensure that the tone and vocabulary match the psychographic profile of the recipient. Psychographic profiles are similarly applicable in the context of providing a customer service representative (e.g., associated with a psychographic profile) to a customer based on the customer and the customer service representative sharing at least one common psychographic dimension/ group. Likewise, customer service responses, in some examples, are tailored according to the psychographic profile of the customer. Psychographic profiles are similarly applicable in the context of personalizing interfaces to match the psychographic profile of the individual. Although the application changes, the processes discussed herein of obtaining a psychographic profile (psychographic dimensions/groups) of an individual, measuring and/or analyzing the effectiveness of previously-provided content in light of the psychographic profile of the individual, and altering content based on the psychographic profile of the individual are equally applicable to these other contexts and are not intended to be limited to the context of online marketing.

Referring now to the drawings, FIG. 1 is a block diagram 100 depicting an example of a content management engine 102 that utilizes psychographic profiles to provide targeted content to one or more individuals.

In accordance with at least one embodiment, the content management engine 102 obtains psychographic profiles corresponding to one or more individuals included in the target audience 104 and the target audience 106. In at least one embodiment, the psychographic profiles are obtained from the psychographic profile data store 108, a data store configured to store such data. In at least one example, the psychographic profiles are associated with a user profile of the individual that contains other information of the individual (e.g., name, address, phone number, shipping address, billing address, etc.). The psychographic profile includes any suitable number of psychographic dimensions and is associated with any suitable number of psychographic groups.

The content management engine 102 obtains content (e.g., from the content data store 110 and/or otherwise received content). The content data store 110 is a data store configured to such data. The content corresponds to targeted content 112 and targeted content 114. Targeted content 112 and targeted content 114 are each associated with one or more psychographic dimensions and/or one or more psychographic groups. Analytics can be used to determine the associations of content with one or more psychographic dimensions and/or one or more psychographic groups. As an example, the analytics may begin with a learning phase where psychographic profiles are constructed about visitors based on their viewing habits, what they do, what they buy, their behavior, etc. This information can then be used to associate content with the correlated psychographic profiles of the visitors in order to then influence other visitors with similar psychographic profiles to acquire similar content. The content management engine 102, in at least one example, matches content to a target audience based on at least one psychographic dimension and/or at least one psychographic group. For example, the content management engine 102 matches the targeted content 112 to the target audience 104 based on a matching psychographic dimension between the psychographic profile(s) of the individual(s) of the target audience 104 and a psychographic dimension associated with the targeted content 112. Similarly, the content management engine 102 matches the targeted content 114 to the target audience 106 based on a matching psychographic dimension between the psychographic profile(s) of the individual(s) of the target audience 106 and a psychographic dimension associated with the targeted content 114.

In at least one embodiment, the content management engine 102 obtains content from the content data store 110. The content management engine 102 determines one or more psychographic dimensions and/or one or more psychographic groups associated with, for example, target audience 104. Based on the one or more psychographic dimensions and/or one or more psychographic groups, the content management engine 102 obtains a template from, for example, the template data store 116, a data store configured to store such information. In at least one embodiment a "template" specifies a set of attributes to utilize when presenting content to a user including, but not limited to, a color scheme, a font, an interface, a content layout, a product selection, a musical selection, an image, a video, a message, language usage, and/or work choice. The content management engine 102 alters the content according to the template to produce the targeted content 112. In this manger, the content management engine 102 personalizes the targeted content 112 according to the psychographic profile(s) of the target audience 104.

In at least one embodiment, the content management engine 102 utilizes historical user information (e.g., sales data) to determine when providing content to an individual eventually resulted in an action (e.g., a sale). For example, the content management engine 102 analyzes any suitable amount of historical user information for a set of individuals. The historical user information identifies that particular individuals associated with a psychographic dimension and/ or group purchased a product more often when presented with content that included particular attributes (e.g., a particular font, a particular image, a particular interface, a particular message, particular language usage and/or word choice, particular musical selection(s), etc.). The content management engine 102, in some cases, identifies an optimal set of attributes for content to be presented to individuals associated with a psychographic dimension and/or group. For example, the content management engine 102 determines, for a set of attribute types (e.g., font, image, message, interface, language usage, word choice, musical selection, etc.) a value most often occurring in content that was presented to individuals who eventually completed the desired action (e.g., purchased the product). In some cases, the values for the set of attribute types need not have been utilized together in previously-presented content. Once a value for each of the set of attribute types (or a subset of attribute types) is determined, the content management engine 102 stores the values as an optimized set of attributes utilizing a template. In at least one example, the template is used by the content management engine 102 to modify content to more accurately appeal to an individual or set of individuals (e.g., associated with a psychographic dimension and/or group).

Utilizing the content management engine 102, the user may realize increased sales by targeting content to particular audiences who are likely to respond favorably to the content.

Figure 2:
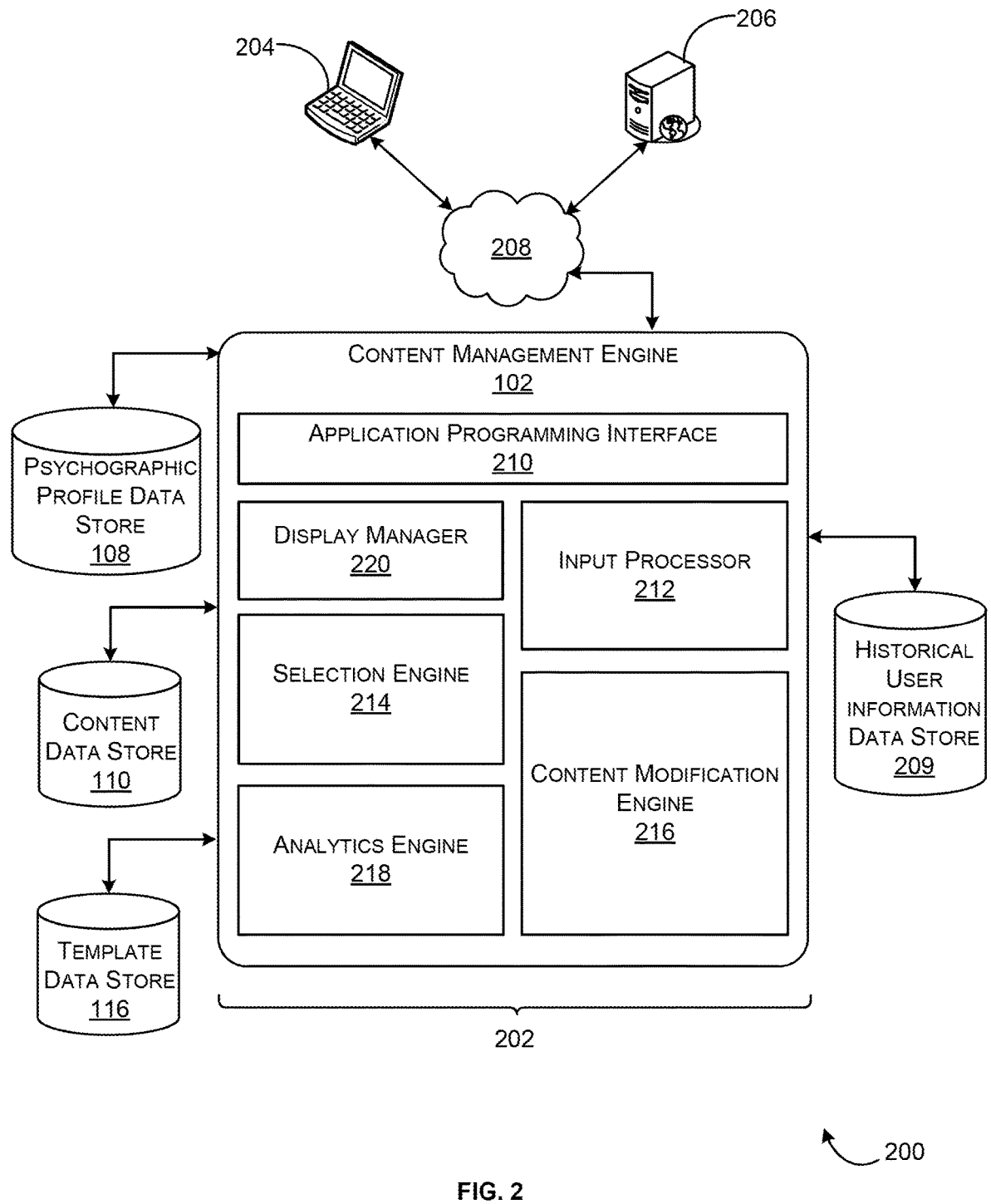
FIG. 2 is an example computer architecture of the content management engine, including a plurality of modules that are utilized to provide various aspects of the content management engine, according to certain exemplary embodiments.

FIG. 2 is an example computer architecture 200 of the content management engine 102 of FIG. 1, including a plurality of modules 202 that are utilized to provide various aspects of the content management engine 102, according to certain exemplary embodiments. The modules 202 are software modules, hardware modules, or a combination thereof. In some examples, the modules 202 are embodied on a computer readable medium and processed by a processor in any of the computer systems described herein. In some embodiments, any module or data store described herein are a service responsible for managing data of the type required to make corresponding calculations. The modules 202 are configured in the manner suggested in FIG. 2 or the modules 202 are configured in a different configuration. Alternatively, the modules are external to the content management engine 102. In some examples, at least one of modules 202 is executed, in whole or in part, on user device 204 (e.g., a laptop) as part of an application executing on user device 204. Likewise, in some examples, a portion of the modules 202 are executed on computing device(s) 206 (e.g., one or more servers). In some examples, the user device 204 and/or the computing device(s) 206 interact with the content management engine 102 via network 208. The network 208 (and any network described herein) includes any appropriate set of communicatively-coupled computing devices and equipment that electronically transmit and receive data. Examples of the network 208 include (but are not limited to) an intranet, the Internet, a cellular network, a local area network, a wide area network, or any other such network or combination thereof.

In the embodiment shown in FIG. 2, a psychographic profile data store 108, the content data store 110, the template data store 116, and the historical user information data store 209 are shown. It should be understood that data can be otherwise maintained, derived, or accessed from various data stores. Such data stores are either remote or local to the content management engine 102. A combination of the data stores depicted in FIG. 2 are located on the computing device(s) 206 and/or are located on the user device 204. The content management engine 102 includes various modules such as an application programming interface 210, an input processor 212, a selection engine 214, a content modification engine 216, an analytics engine 218, and a display manager 220. In some examples, the modules 202 are combined in any suitable combination. Some functions of the modules 210, 212, 214, 216, 218, and 220 are described below. However, for the benefit of the reader, a brief, non-limiting description of each of the modules is provided in the following paragraphs.

The application programming interface 210 is utilized by the content management engine 102 to receive and/or transmit any suitable information (e.g., a psychographic profile of an individual, content, a template, etc.), for example, between the content management engine 102 and the user device 204 and/or computing device(s) 206 via the network 208.

In accordance with at least one embodiment, the input processor 212 is configured to receive a psychographic profile (and/or one or more psychographic dimensions). In at least one example, a received psychographic profile is associated with an individual (e.g., via a user profile) and stored in the psychographic profile data store 108. The input processor 212 is further configured to receive content to be presented to one or more individuals. The input processor 212, in some examples, stores the content in content data store 110. The input processor 212 is further configured to receive a template for modifying content. The template, in at least one example, is stored in template data store 116. The input processor 212 is further configured to receive textual input data, clickstream data, past-purchase information, and/or survey-response data and store such data in historical user information data store 209, a data store configured to store such information. The input processor 212 is further configured to receive a selection request corresponding to a request to identify a target audience for particular content, and/or a request to identify content given a target audience (e.g., identified by one or more psychographic dimensions and/or one or more psychographic groups). The selection request identifies particular content, a particular audience (e.g., group of users), etc. In at least one embodiment, the selection request identifies a product and a marketing budget and corresponds to a request to select both the target audience and the content which will provide a highest likelihood (e.g., probability) of sales given the marketing budget.

In accordance with at least one embodiment, the selection engine 214 is configured to select content and/or a target audience (e.g., in response to a selection request). For example, the selection engine 214 determines, based on one or more psychographic dimensions and/or one or more psychographic groups associated with a set of individuals, content to be presented to the set of individuals. The selection engine 214 compares the one or more psychographic dimensions and/or one or more psychographic groups of the individual to a psychographic dimension/group associated with various content (e.g., content obtained from the content data store 110 or received content). In at least one example, the selection engine 214 selects content having a greatest number of matching psychographic dimensions/groups as the psychographic dimensions/groups associated with the set of individuals. In at least one example, the selection engine 214 scores the content according to the number of matching psychographic dimensions/groups and selects a highest scored content (or a number of highest-scored content). In another example, the selection engine 214 selects a set of individuals based on a comparison of psychographic dimensions/groups of the set of individuals to psychographic dimensions/groups associated with particular content (e.g., content stored in content data store 110 or received content). The selection engine 214 may score the set of individual based on the comparison and select a highest or a set of highest scored individuals (e.g., the top 100, depending on, for example, the selection request) as the targeted audience.

In accordance with at least one embodiment, the content modification engine 216 is configured to modify content according to a template. For example, content selected by the selection engine 214 is obtained. The content modification engine 216 obtains a corresponding template (e.g., a template that is associated with a greatest number of common psychographic dimensions/groups between the template and the content). Once a template is obtained, the content modification engine 216 utilizes various attributes of the template to modify the content. For example, the template defines a particular font to be used for a particular psychographic group. Accordingly, the content modification engine 216 modifies text included in the content to be presented in the particular font specified in the template.

In accordance with at least one embodiment, the analytics engine 218 is configured to obtain historical user information from the historical user information data store 209, a data store configured to store such information. Historical user information includes, but is not limited to, past-purchase information, clickstream data (e.g., online navigation history, hyperlink selections, online session data, etc.), search query history, textual input data, survey-response data, and the like. The analytics engine 218 analyzes the historical user information to identify a set of attributes of content (e.g., a particular font, a particular product, a particular interface, a particular image, a particular message, particular language usage and/or word choice, particular musical selection(s), etc.) that, after being provided to an individual, resulted in a desired action (e.g., a purchase of a featured product, viewing of a web page, viewing of an email, a positive review regarding a customer service contact, a positive review regarding a product, etc.). The analytics engine 218 analyzes the historical user information of a particular individual or a set of individuals (e.g., individuals who share a psychographic dimension and/or psychographic group) to make such identification. For example, the analytics engine 218 collects purchase information of a set of individuals that purchased a particular product. The analytics engine 218 then determines specific content that was presented to the set of individuals at various times prior to the individual's purchases. The analytics engine 218 determines the attributes that were utilized most often in the content that was provided to the set of individuals. The attributes need not have been utilized by a single piece of content, the attributes may have been utilized across multiple pieces of content. Upon identifying the set of attributes that resulted in a desired action, the analytics engine 218 is configured to store the set of attributes in a template. The analytics engine 218 stores the template in the template data store 116, a data store configured to store such information.

In accordance with at least one embodiment, the display manager 220 is configured to provide the content (modified or unmodified) to a set of individuals (e.g., target audience 104 and/or target audience 106). Additionally, or alternatively, the display manager 220 presents information which identifies the set of individuals that have a greatest number of common psychographic dimensions/groups as selected content. In at least one example, the display manager 220 is configured to present analytics data generated by the analytics engine 218.

FIG. 3 is an example chart 300 that depicts a number of example psychographic groups, according to certain exemplary embodiments of the content management engine 102 of FIGS. 1 and 2. It should be appreciated that the chart 300 is merely an example and is not intended to be limiting.

The chart 300 includes column 302, column 304, and column 306. Column 302 corresponds to a group name, specifically, "socially conscious," "mainstream," "leader," "ambitious," "elderly," and "explorer." Column 304 corresponds to a group description and column 306 corresponds to an associated dimension for which a value over a threshold indicates that a particular individual belongs to the psychographic group.

For example, an individual associated with the "socially conscious" psychographic group is one who is associated with a psychographic profile that includes a psychographic dimension D1 having a value over a particular threshold (e.g., 50). An individual who is "socially conscious" is one who is a materialistic, acquisitive person who is driven by other's perceptions of them rather than by their own values. The socially conscious individual responds to appearance, persona, charisma, and fashion. Attractive packing is often as important to the socially conscious person as actual content. The socially conscious person is interested in gaining status.

An individual associated with the "mainstream" psychographic group is one who is associated with a psychographic profile that includes a psychographic dimension D2 having a value over a particular threshold (e.g., 60). An individual who is "mainstream" is one who is a materialistic, acquisitive person who lives in the worlds of the domestic and every day. A daily routine is fundamental to the way that the mainstream individual lives his or her life. Life choices of the mainstream individual are often objective (we) rather than subjective (me). A mainstream individual typically responds highly to established brand, to "family" brand and to offers of value for money. A mainstream individual is often interested in security.

An individual associated with the "leader" psychographic group is one who is associated with a psychographic profile that includes a psychographic dimension D3 having a value over a particular threshold (e.g., 45). An individual associated with the "leader" psychographic group is one who values their own independent judgement. A "leader" is mostly anti-materialistic and intelligent. A "leader" is typically socially aware and prides themselves on tolerance of others. A "leader" often seeks out the authentic and the harmonious and is often at the leading edge of society. A "leader" will not purchase something just because it is new.

An individual associated with the "ambitious" psychographic group is one who is associated with a psychographic profile that includes a psychographic dimension D4 having a value over a particular threshold (e.g., 70). An individual associated with the "ambitious" psychographic group is one who possess self-confidence and has a strong goal-oriented nature. The "ambitious" individual tends to be very organized and tend to support the status quo. When it comes to brands, the "ambitious" individual seeks reward and prestige and will often seek out the best, because that is what they feel they deserve. The "ambitious" individual also seeks outs caring and protective brands and is interested in maintaining control.

An individual associated with the "mainstream" psychographic group is one who is associated with a psychographic profile that includes a psychographic dimension D9 having a value over a particular threshold (e.g., 60) as well as a psychographic dimension D10 having a value under a particular threshold (e.g., 30). An individual associated with the "elderly" psychographic group is one who is associated with constant, unchanging values that have been built over time. For them, the past is bathed in a warm, nostalgic glow. The "elderly" individual respects institutions and enjoys acting in traditional roles. The "elderly" individual's brand choices is typically driven by a need for safety and economy. They often choose what is familiar to them.

An individual associated with the "explorer" psychographic group is one who is associated with a psychographic profile that includes a psychographic dimensions D5 and D6 each having a value over a particular threshold (e.g., 80). An individual associated with the "explorer" psychographic group is one who is driven by a need for discovery, challenge, and new frontiers. Young in nature, if not in reality, explorers are often the first to try out new ideas and experiences. They respond to brands that offer new sensations, indulgence, and instant effect. In short, differences is what an explorer seeks.

A psychographic group is associated with any suitable number of psychographic dimensions. Although dimension values are shown as integers, any suitable score (e.g., integer, decimal, etc.) is equally applicable. In some examples, a range (e.g., between 30 and 50) is utilized to determine when one or more dimensions indicates that an individual belongs to a particular psychographic group. Some psychographic groups share common dimensions. Additionally, in some cases, an individual is associated with multiple psychographic groups.

FIGS. 4A and 4B depict example content specifications (e.g., content specification 402 and content specification 404), according to certain exemplary embodiments of the content management engine 102 of FIGS. 1 and 2. The content specification 402 includes a number of attributes associated with particular content. For example, the content specification 402 includes an content identifier "Ad 1" although any suitable identifier may be equally utilized. The content identifier specifies particular content (e.g., an advertisement) with which the content specification 402 is related. The content specification 402 further specifies that the identified content is associated with a number of psychographic dimensions, namely, D1, D4, and D5 having corresponding scores (e.g., 90, 80, and 75, respectively). The content specification 402 further specifies that the related marketing content is associated with a psychographic group "leader." The content specification 402 further specifies a "muted" color scheme, in some cases, corresponding to a color scheme including blues and grays. The content specification 402 further specifies a font "Arial narrow." The content specification 402 further specifies an image (e.g., "car-in-city.jpg). In some examples, this image includes a car driving on a city street with sky-scrapers in the background. The content specification 402 further specifies a message (e.g., "Acme Novella, simply amazing.").

The content specification 404 includes a number of attributes. For example, the content specification 404 includes an content identifier "Ad 2" although any suitable identifier may be equally utilized. The content identifier specifies particular content (e.g., an advertisement) with which the content specification 404 is related. The content specification 404 further specifies that the identified content is associated with a number of psychographic dimensions, namely, D1, D6, and D4 having corresponding scores (e.g., 90, 90, and 40, respectively). In some examples, the scores identify a threshold to be utilized when determining whether an corresponding psychographic dimension of an individual is to be presented the identified content associated with the content specification 404. The threshold further indicates, in some cases, whether the corresponding psychographic dimension of the individual should be above, below, or equal to the threshold when determining whether or not to provide the identified content to the individual. The content specification 404 further specifies that the identified content is associated with a psychographic group "explorer." The content specification 404 further specifies a "bright" color scheme, in some cases, corresponding to a color scheme including yellows, oranges, and reds of particular color tones. The content specification 404 further specifies a font "Calibri" to be utilized when providing the identified content. The content specification 404 further specifies an image (e.g., "car-on-mountain.jpg). In some examples, this image includes a mud-splattered car (e.g., the same car as in the image associated with the content specification 402) driving on a rural road with a mountain in the background. The content specification 404 further specifies a message (e.g., "Acme Novella, built for all your adventures.").

It should be appreciated that content specifications, in some cases, include a more or fewer attributes than the number of attributes depicted in FIGS. 4A and 4B. For example, a product identifier is included in some content specifications that corresponds to a particular product featured in the identified marketing content. Content specifications, in some cases, further include attributes identifying a content layout, a musical selection, a video, a type of language usage (e.g., southern, mid-western, north-western, etc.) and/or a word choice. In some cases, a content specification is specified in a markup language, in a container or object, or as metadata associated with particular content.

FIGS. 5A and 5B depict example templates (e.g., template 502 and template 504), according to certain exemplary embodiments of the content management engine 102 of FIGS. 1 and 2. The template 502 includes a number of attributes including a psychographic group identifier (e.g., "explorer") corresponding to a psychographic group. In some examples, the template 502 further specifies a color scheme (e.g., blues and greens) that corresponds to a predetermined color scheme that is to be utilized when presenting content to an individual of the identified psychographic group. The template 502 further specifies a font "Calibri" to be utilized when providing content to an individual of the identified psychographic group. The template 502 further specifies a product identifier (e.g., Acme Novella LX). In the example depicted in FIG. 5A, the product identified is associated with a car of a particular make, model and trim (e.g., Acme, Novella, LX, respectively). The product identifier specifies a product to be featured in content provided to individuals of the identified psychographic group associated with the psychographic group identifier. The template 502 further specifies an image (e.g., car-on-mountain.jpg) to be utilized when providing content to an individual of the identified psychographic group. The template 502 further specifies a message (e.g., "Acme Novella LX, Built for all of your adventures") to be utilized when providing content to an individual of the identified psychographic group.

The template 504 includes a number of attributes including one or more psychographic dimensions (e.g., D1 and D4) and corresponding threshold values (e.g., 90 and 80, respectively). In some examples, the template 504 further specifies a color scheme (e.g., "fresh" that corresponds to a predetermined color scheme (e.g., including yellows, greens, and blues of particular color tones) that is to be utilized when presenting content to an individual having. The template 502 further specifies a font (e.g., "Calibri") to be utilized when providing content to an individual of the identified psychographic group. The template 502 further specifies a product identifier (e.g., Acme Novella Limited). In the example depicted in FIG. 5B, the product identified is associated with a car of a particular make, model and trim (e.g., Acme, Novella, Limited, respectively). Although, any suitable product identifier may be used. The product identifier specifies a product to be featured in content provided to an individual associated with one or more of the identified psychographic dimensions (e.g., D1 and D4). The template 504 further specifies an image (e.g., car-in-big-tree.jpg depicting an Acme Novella parked within a hallowed out tree trunk of a live tree) to be utilized when providing content to an individual associated with the identified psychographic dimensions. The template 504 further specifies a message (e.g., "Acme Novella Limited, Built for all of your adventures") to be utilized when providing content to an individual of the identified psychographic group.

In at least one embodiment, templates are generated by the analytics engine or are pre-specified. Such templates are used (e.g., by the content modification engine 216 of FIG. 2) in order to modify content to conform to attributes that have been identified as being most appealing to a particular individual or group of individuals (e.g., individuals that share a common psychographic dimension and/or psychographic group). Templates are stored in the template data store 116 of FIG. 1.

Figure 6:
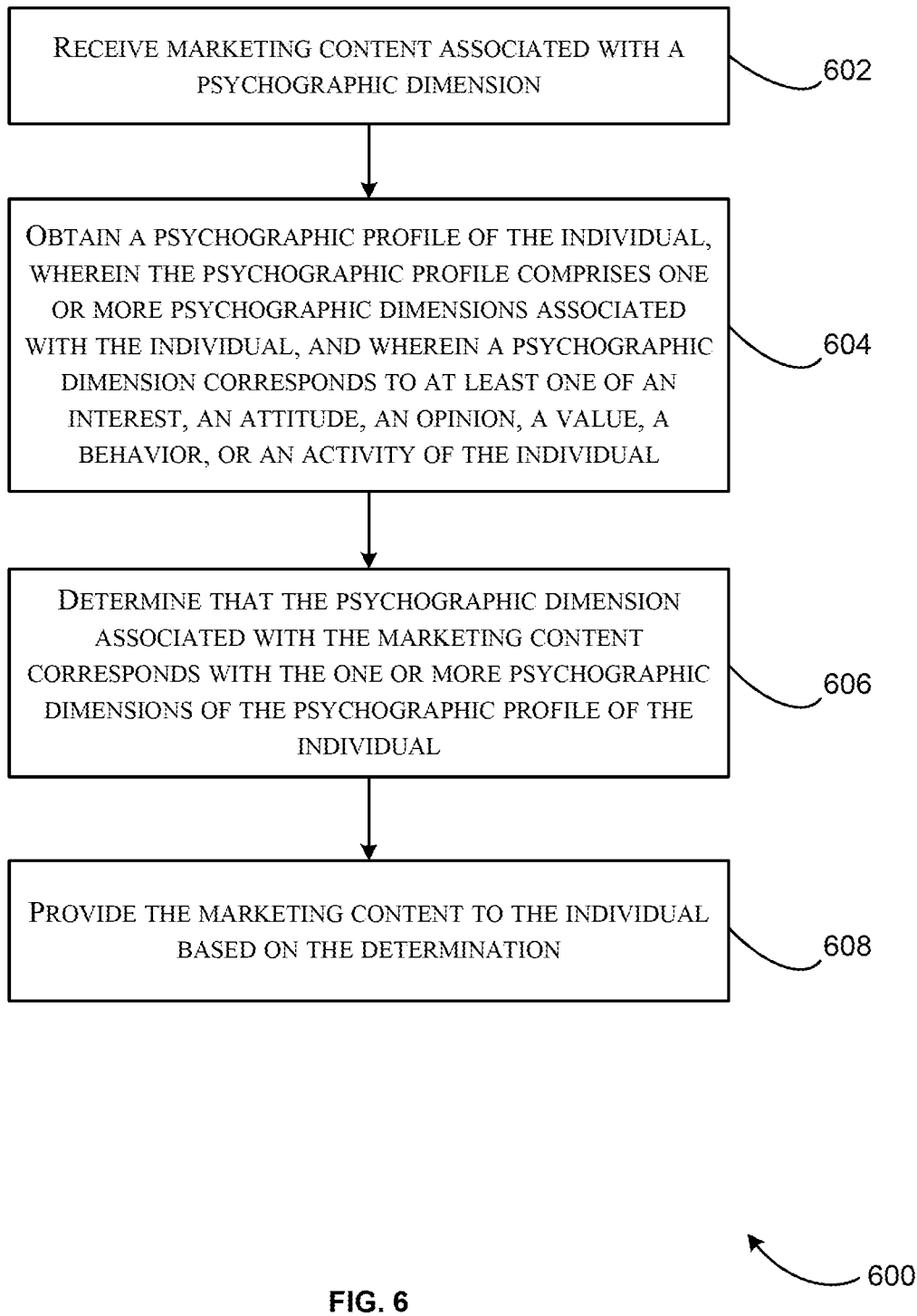
FIG. 6 is a flow chart depicting an example process for providing target content to an individual based on a psychographic profile of the individual, according to certain exemplary embodiments of the content management engine.

FIG. 6 is a flow chart depicting an example process 600 for providing target content to an individual based on a psychographic profile of the individual, according to certain exemplary embodiments of the content management engine 102 of FIGS. 1 and 2. The process 600 begins at block 602 where marketing content associated with a psychographic dimension is received (e.g., by the input processor 212 of FIG. 2). In some cases, the marketing content is associated with a content specification similar to the example content specifications of FIGS. 4A and 4B or other metadata that enable a psychographic dimension of the marketing content to be identified. As a non-limiting example, the marketing content comprises an advertisement associated with a particular psychographic dimension, meaning, in this case, that the marketing content is intended to appeal to an individual who values a bargain.

At block 604, a psychographic profile of the individual is obtained (e.g., by the selection engine 214 of FIG. 2). In at least one example, the psychographic profile comprises one or more psychographic dimensions associated with the individual. A psychographic dimensions corresponds to at least one of an interest, an attitude, an opinion, a value, a behavior, or an activity of the individual. In the ongoing example, the psychographic profile indicates that the individual in question is values bargain deals (e.g., a sales discount). In at least one example, the psychographic profile is based on textual data submitted by the individual, clickstream data of the individual, past-purchase information of the individual, and/or survey-response data of the individual.

At block 606, it is determined (e.g., by the selection engine 214) that the psychographic dimension associated with the marketing content corresponds with the one or more psychographic dimensions of the psychographic profile of the individual. In at least one example, the selection engine 214 compares the psychographic dimension associated with the marketing content to the one or more psychographic dimensions associated with the individual to determine a match. In at least one example, a match consists of determining that a score of the psychographic dimension for the individual is higher than (or lower than, or equal to) a threshold value (e.g., 50).

At block 608, the marketing content is provided (e.g., by the display manager 220 of FIG. 2) to the individual based on the determination at block 606. In at least one example, the display manager 220 provides the marketing content via a webpage provided by the computing device(s) 206 of FIG. 2. In another example, the display manager 220 provides the marketing content via an electronic message, a text message, or any suitable form of electronic communication.

Figure 7:
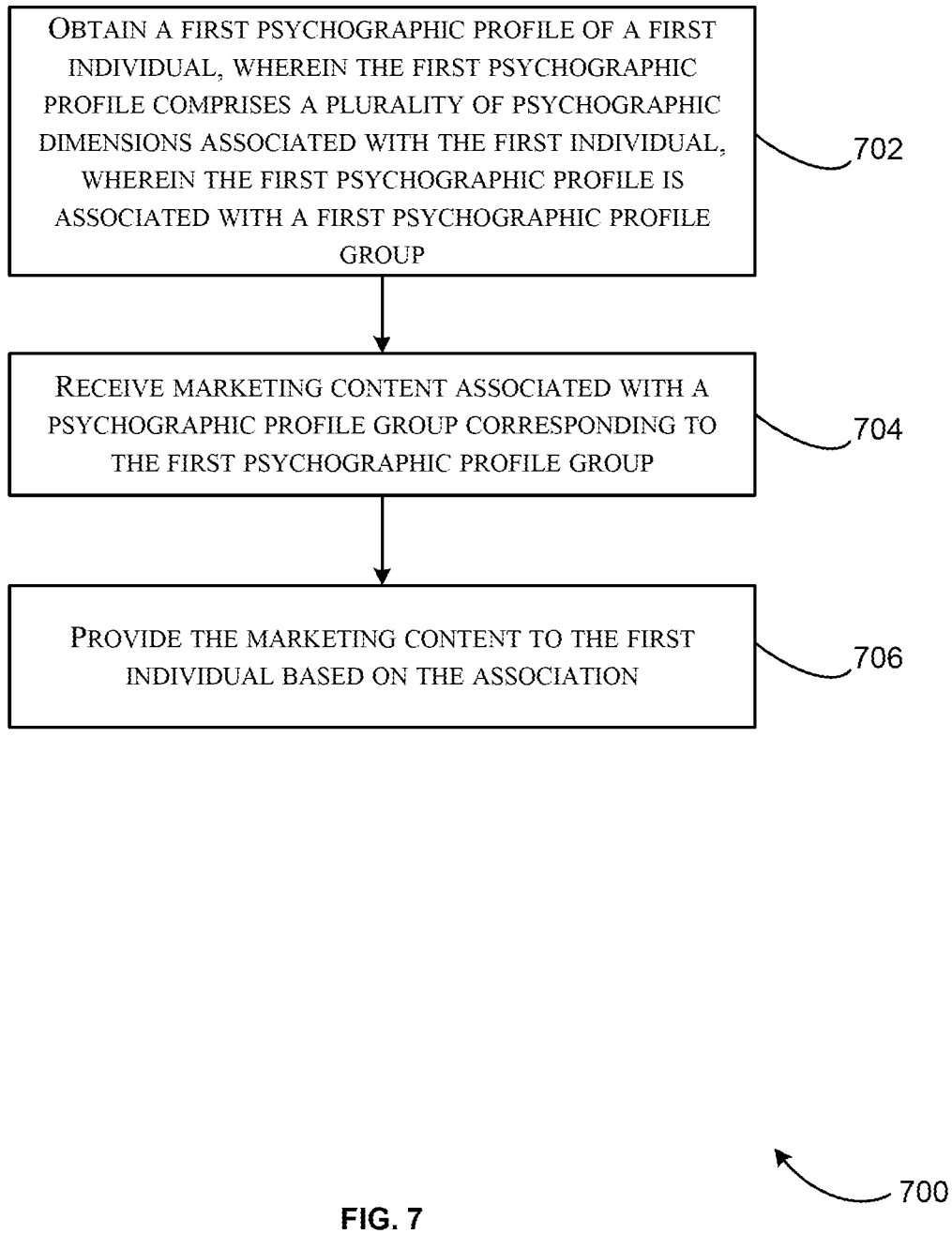
FIG. 7 is a flow chart depicting another example process for providing target content to an individual based on a psychographic profile of the individual, according to certain exemplary embodiments of the content management engine.

FIG. 7 is a flow chart depicting another example process 700 for providing target content to an individual based on a psychographic profile of the individual, according to certain exemplary embodiments of the content management engine 102 of FIGS. 1 and 2. The process 700 begins at block 702 where a first psychographic profile of a first individual is obtained (e.g., by the selection engine 214 of FIG. 2). The first psychographic profile comprises one or more psychographic dimensions associated with the first individual. The first psychographic profile is associated with a first psychographic profile group (e.g., "explorer"). In at least one example, the first psychographic profile group is based on the one or more psychographic dimensions of the individual.

At block 704, marketing content associated with a psychographic profile group (e.g., "explorer") corresponding to the first psychographic profile group is received (e.g., by the input processor 212 of FIG. 2). In some cases, the marketing content is associated with a content specification similar to the example content specifications of FIGS. 4A and 4B or other metadata that enable a psychographic dimension of the marketing content to be identified. In at least one example, the input processor 212 stores the marketing content (and the content specification) in the content data store 110 of FIGS. 1 and 2. In at least one example, the marketing content is associated with a set of attributes that identify at least one of a color scheme, a font, an interface a content layout, a product selection, a musical selection, an image, a video, a message, language usage and/or word choice. The set of attributes, in some cases, are included as metadata of the marketing content and/or are provided via a content specification associated with the marketing content.

At block 706, the marketing content is provided (e.g., by the display manager 220 of FIG. 2) to the first individual based on the associated psychographic profile group. In at least one example, the marketing content is selected by the selection engine 214 of FIG. 2 prior to being provided by the display manager 220.

Figure 8:
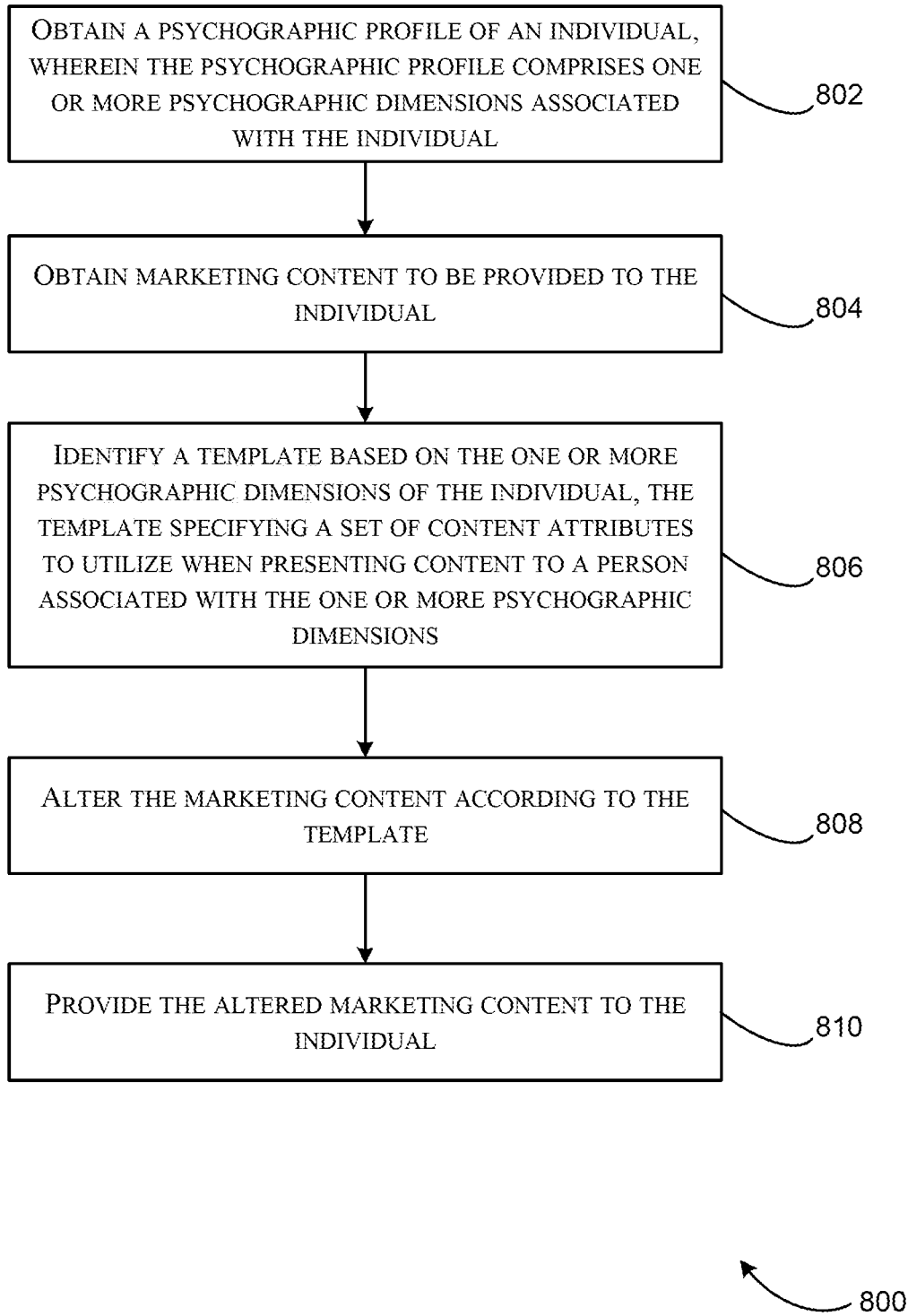
FIG. 8 is a flow chart depicting yet another example process for providing target content to an individual based on a psychographic profile of the individual, according to certain exemplary embodiments of the content management engine.

FIG. 8 is a flow chart depicting yet another example process 800 for providing target content to an individual based on a psychographic profile of the individual, according to certain exemplary embodiments of the content management engine 102 of FIGS. 1 and 2. The process 800 begins at block 802, where a psychographic profile of an individual is obtained. In at least one example, the psychographic profile comprises one or more psychographic dimensions associated with the individual. As discussed above, the psychographic dimension corresponds to at least one of an interest, an attitude, an opinion, a value, a behavior, or an activity of the individual.

At block 804, marketing content to be provided to the individual is obtained (e.g., by the selection engine 214 of FIG. 2). In at least one example, the marketing content is obtained by the selection engine 214 from the content data store 110 of FIGS. 1 and 2. In other examples, the marketing content is received by the input processor 212 of Figure and conveyed to the selection engine 214. As a non-limiting example, the selection engine 214 scores various marketing content according to how closely related the marketing content is to the psychographic profile of the individual. For example, marketing content that is associated with a psychographic dimension that is known to be related to one or more psychographic dimensions of the individual's psychographic profile is scored higher than marketing content that is associated with a psychographic dimensions that is known to be unrelated to the psychographic dimensions of the individual's psychographic profile. In some cases, the marketing content having the highest score with respect to the individual's psychographic profile is selected by the selection engine 214.

At block 806, a template is identified (e.g., by the content modification engine 216 of FIG. 2) based on one or more psychographic dimensions of the individual. In at least one example, the template specifies a set of content attributes to utilize when presenting content to a person associated with the one or more psychographic dimensions. The templates of FIGS. 5A and 5B are examples of such a template. In accordance with at least one embodiment, the content modification engine 216 scores various templates according to how similar the psychographic dimensions associated with a template is with respect to the psychographic dimensions of the individual. A highest scored template is selected by the content modification engine 216.

At block 808, the marketing content is altered according to the template identified at block 806. As a non-limiting example, the content modification engine 216 determines, utilizing the template, that a particular color scheme should be used. The color scheme identified in the template is different than the color scheme initially provided in the marketing content. Accordingly, the content modification engine 216 alters the marketing content to utilize the color scheme identified in the template.

At block 810, the altered marketing content is provided to the individual (e.g., by the display manager 220 of FIG. 2). As described above, the display manager 220 causes the altered marketing content to be provided to the individual via a webpage, an electronic message, a text message, or via any suitable electronic communication.

Exemplary Computing Environment

Figure 9:
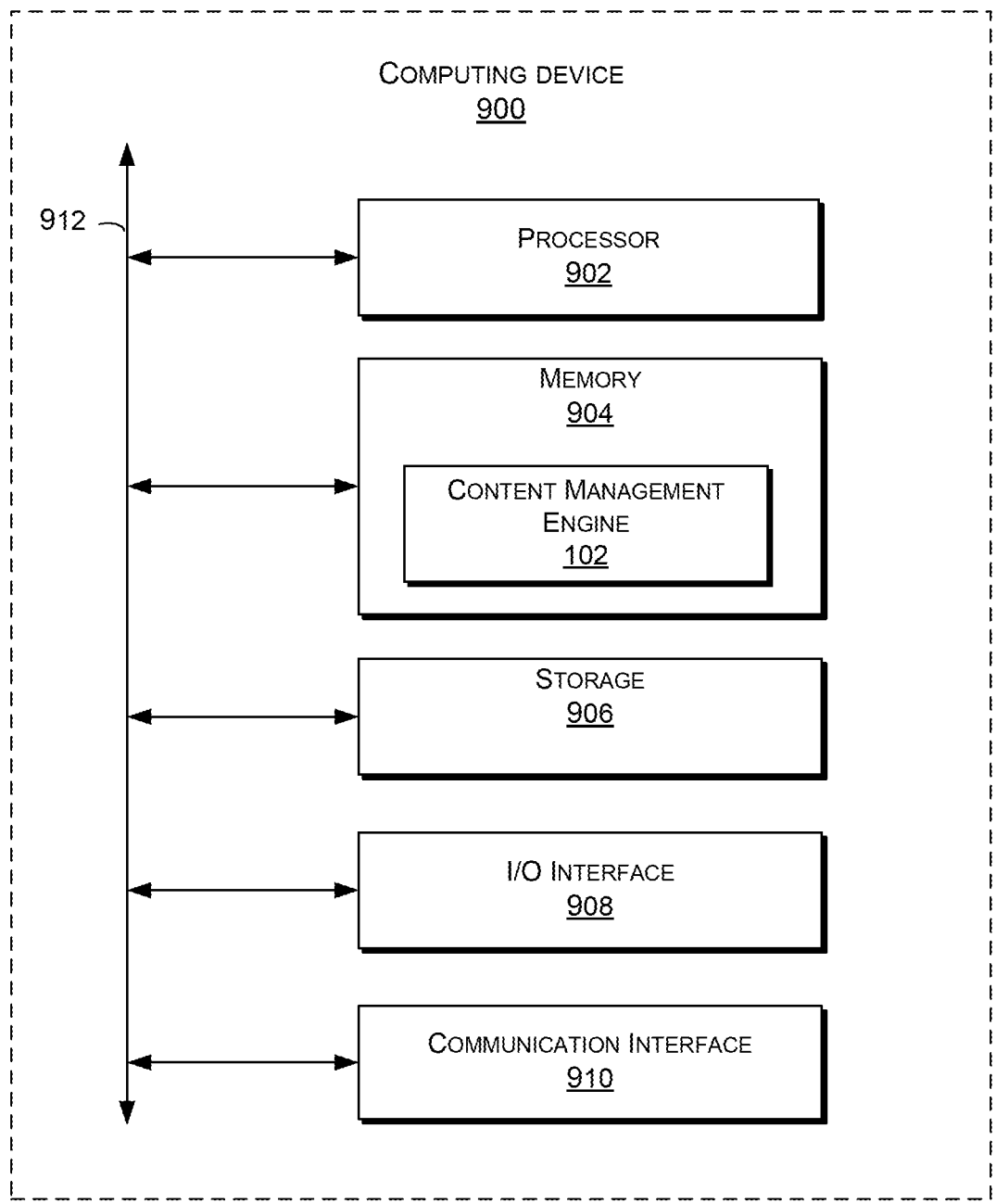
FIG. 9 is a block diagram depicting an example of a computing system that executes the content management engine for enforcing usage policies for data according to certain exemplary embodiments.

Any suitable computing system or group of computing systems can be used to implement the techniques and methods disclosed herein. For example, FIG. 9 is a block diagram depicting examples of implementations of such components. The computing device 900 can include a processor 902 that is communicatively coupled to a memory 904 and that executes computer-executable program code and/or accesses information stored in the memory 904 or storage 906. The processor 902 comprises a microprocessor, an application-specific integrated circuit ("ASIC"), a state machine, or other processing device. The processor 902 includes one processing device or more than one processing device. Such a processor includes or is in communication with a computer-readable medium storing instructions that, when executed by the processor 902, cause the processor to perform the operations described herein.

The memory 904 and storage 906 can include any suitable non-transitory computer-readable medium. The computer-readable medium includes any electronic, optical, magnetic, or other storage device capable of providing a processor with computer-readable instructions or other program code. Non-limiting examples of a computer-readable medium include a CD-ROM, a DVD, a magnetic disk, memory chip, ROM, RAM, an ASIC, a configured processor, optical storage, magnetic tape or other magnetic storage, or any other medium from which a computer processor can read instructions. The instructions include processor-specific instructions generated by a compiler and/or an interpreter from code written in any suitable computer-programming language, including, for example, C, C++, C#, Visual Basic, Java, Python, Perl, JavaScript, and ActionScript.

The computing device 900 also comprises a number of external or internal devices such as input or output devices. For example, the computing device 900 is shown with an input/output ("I/O") interface 908 that can receive input from input devices or provide output to output devices. A communication interface 910 is also included in the computing device 900 and can include any device or group of devices suitable for establishing a wired or wireless data connection to one or more data networks. Non-limiting examples of the communication interface 910 include an Ethernet network adapter, a modem, and/or the like. The computing device 900 transmits messages as electronic or optical signals via the communication interface 910. A bus 912 is also included to communicatively couple one or more components of the computing device 900.

The computing device 900 executes program code that configures the processor 902 to perform one or more of the operations described above. The program code includes one or more modules. For example, the program includes the content management engine 102 or other suitable engine, module, or application that can be used to generate a psychographic profile of an individual. The program code is resident in the memory 904, storage 906, or any suitable computer-readable medium and executed by the processor 902 or any other suitable processor. In some embodiments, modules are resident in the memory 904. In additional or alternative embodiments, one or more modules are resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method that includes one or more processing devices of a content management system performing operations comprising:

obtaining, from a remote psychographic profile data store separate from the content management system, a psychographic profile of an individual associated with a user device, wherein the psychographic profile comprises psychographic dimension values quantifying respective psychographic dimensions associated with the individual, and wherein each of the psychographic dimensions corresponds to one or more of an interest, an attitude, or an opinion of the individual;

determining that the individual is associated with a particular psychographic profile group by comparing the psychographic dimensions of the psychographic profile to corresponding psychographic dimensions of each of one or more psychographic profile groups and determining that at least one of the psychographic dimension values of the psychographic profile meets a threshold criteria for a corresponding psychographic dimension of the particular psychographic profile group;

retrieving, from a remote content data store separate from the content management system, electronic content for the individual, wherein retrieving the electronic content comprises:

accessing, in the remote content data store, multiple instances of content associated with the particular psychographic group, each instance of content including a respective set of psychographic dimensions, each psychographic dimension of the respective set of psychographic dimensions associated with a respective threshold psychographic dimension value;

comparing, for each instance of content, each of the threshold psychographic dimension values to psychographic dimension values of the particular psychographic profile; and determining, for each instance of content, a content similarity score based on a number of psychographic dimension values of the psychographic profile that exceed corresponding threshold psychographic dimension values associated with the instance of content, wherein the retrieved electronic content for the individual comprises an instance of content from the multiple instances of content having a greatest content similarity score;

selecting, from a remote template data store separate from the content management system, a template associated with the particular psychographic profile group, the template specifying content attributes comprising a first set of color data for graphical elements within the electronic content and a first font to be applied to text within the electronic content;

determining that the electronic content has a second set of color data for the graphical elements and a second font applied to the text;

based on the template, altering the electronic content by changing the graphical elements to be displayed with the first set of color data rather than the second set of color data and changing the second font applied to the text within the electronic content into the first font; and transmitting the electronic content, as altered, to the user device.

2. The method of claim 1, further comprising:

obtaining, from the remote psychographic profile data store, an additional psychographic profile of a second individual, wherein the second psychographic profile comprises second psychographic dimensions associated with the second individual;

determining that the second individual is associated with a second psychographic profile group by comparing the second psychographic dimensions of the second psychographic profile to corresponding second psychographic dimensions of each of the one or more psychographic profile groups and determining that at least one of the second psychographic dimension values of the second psychographic profile meets a second threshold criteria for a corresponding second psychographic dimension of the second psychographic profile group;

altering the electronic content by applying a second template corresponding to the second psychographic profile associated with the second individual; and providing the electronic content, as altered using the second template, to a second user device associated with the second individual.

3. The method of claim 1, wherein the psychographic profile of the individual is identified based on textual data submitted by the individual, clickstream data of the individual, past-purchase information of the individual, or survey-response data of the individual.

4. The method of claim 1, wherein determining the particular psychographic profile group for the individual comprises:

obtaining a plurality of rules that denote a particular value threshold above which a particular psychographic dimension value of the one or more psychographic dimension values associated with the psychographic profile of the individual is considered to be demonstrative of the particular psychographic profile group;

determining that the particular psychographic dimension value that is greater than the particular value threshold; and associating the psychographic profile with the particular psychographic profile group based on the particular psychographic dimension value being greater than the particular value threshold.

5. The method of claim 1, wherein altering the electronic content further comprises altering, to match a corresponding content attribute in the template, at least one of: an interface, a content layout, a product selection, a musical selection, an image, a video, a message, language usage, or word choice, wherein the electronic content comprises an offer, an advertisement, a marketing email, or a discount opportunity.

6. The method of claim 1, wherein the content attributes further comprise at least one of: an interface, a content layout, a product selection, a musical selection, an image, a video, a message, language usage, or word choice associated with particular marketing content to be presented to particular groups of people.

7. The method of claim 1, wherein the content attributes further comprise a layout.

8. The method of claim 7, further comprising:

obtaining a plurality of rules that denote a particular value threshold above which a particular psychographic dimension of the one or more psychographic dimensions associated with the psychographic profile of the individual is considered to be demonstrative of the particular psychographic group;

determining that the particular psychographic dimension is associated with a particular value that is greater than the particular value threshold; and assigning the psychographic profile with the particular psychographic group based on the particular value being greater than the particular value threshold.

9. The method of claim 1, wherein a different template in the remote template psychographic profile data store has different content attributes associated with a second combination of psychographic dimension values, wherein the template is selected based on a first combination of psychographic dimension values for the template having a greater similarity to the psychographic dimension values for the psychographic profile of the individual as compared to the second combination of psychographic dimension values for the different template.

10. A content management computing system comprising:
processing hardware;
a non-transitory computer-readable medium communicatively coupled to the processing hardware, wherein the processing hardware is configured for executing instructions stored in the non-transitory computer-readable medium and thereby performing operations comprising:
creating a template specifying content attributes comprising a first set of color data for graphical elements and a first font to be applied to text;
obtaining, from a remote psychographic profile data store separate from the content management computing system, a psychographic profile of an individual associated with a user device, wherein the psychographic profile comprises psychographic dimension values quantifying respective psychographic dimensions associated with the individual, and wherein each of the psychographic dimensions corresponds to one or more of an interest, an attitude, or an opinion of the individual;
determining that the individual is associated with a particular psychographic profile group by comparing the psychographic dimensions of one or more psychographic profile groups and determining that at least one of the psychographic dimension values of the psychographic profile meets a threshold criteria for a corresponding psychographic dimension of the particular psychographic profile group;
retrieving, from a remote content data store separate from the content management computing system, electronic content for the individual, wherein retrieving the electronic content comprises:
accessing, in the remote content data store, multiple instances of content associated with the particular psychographic group, each instance of content including a respective set of psychographic dimensions, each psychographic dimension of the respective set of psychographic dimensions associated with a respective threshold psychographic dimension value;
comparing, for each instance of content, each of the threshold psychographic dimension values to psychographic dimension values of the particular psychographic profile; and
determining, for each instance of content, a content similarity score based on a number of psychographic dimension values of the psychographic profile that exceed corresponding threshold psychographic dimension values associated with the instance of content, wherein the retrieved electronic content for the individual comprises an instance of content from the multiple instances of content having a greatest content similarity score;

selecting, from a remote template psychographic profile data store separate from the content management computing system, the template based on the particular psychographic profile group;
determining that the electronic content has a second set of color data for graphical elements of the electronic content and a second font applied to the text;
based on the template, altering the electronic content by changing the graphical elements to be displayed with the first set of color data rather than the second set of color data and changing the second font applied to the text within the electronic content into the first font; and
causing one or more communicating devices to transmit the electronic content, as altered, to the user device.

11. The computing system of claim 10, further comprising:
obtaining, from the remote psychographic profile data store, an additional psychographic profile of an additional individual, wherein the additional psychographic profile is associated with an additional psychographic group that is different than the particular psychographic group;
performing a different alteration of the electronic content according to the additional psychographic group; and
transmitting the electronic content having the different alteration to an additional user computing device associated with the additional individual.

12. The computing system of claim 10, wherein the content attributes of the template further comprise at least one of: an interface, a content layout, a product selection, a musical selection, an image, a video, a message, language usage, or word choice.

13. The computing system of claim 12, wherein altering the electronic content further comprises altering, to match a corresponding content attribute in the template, at least one of: the interface, the content layout, the product selection, the musical selection, the image, the video, the message, the language usage, or the word choice, the electronic content comprising an offer, an advertisement, a marketing email, or a discount opportunity.

14. The computing system of claim 10, wherein the content attributes further comprise a layout.

15. The computing system of claim 10, wherein a different template in the remote template psychographic profiled data store has different content attributes associated with a second combination of psychographic dimension values, wherein the template is selected based on a first combination of psychographic dimension values for the template having a greater similarity to the psychographic dimension values of the psychographic profile for the individual as compared to a second combination of psychographic dimension values for the different template.

16. A method, comprising:
by a content management computing system:
creating a template specifying content attributes comprising a first set of color data for graphical elements and a first font to be applied to text, wherein creating the template comprises storing the template in a psychographic profile data store;
obtaining, from a remote psychographic profile data store separate from the content management computing system, a psychographic profile of an individual associated with a user device, wherein the psychographic profile comprises psychographic dimension values quantifying respective psychographic dimensions associated with the individual, and wherein each of the psychographic dimensions corresponds to one or more of an interest, an attitude, or an opinion of the individual;

determining that the individual is associated with a particular psychographic profile group by comparing the psychographic dimensions of the psychographic profile to corresponding dimensions of each of one or more psychographic profile groups and determining that at least one of the psychographic dimension values of the psychographic profile meets a threshold criteria for a corresponding psychographic dimension of the particular psychographic profile group;

retrieving, from a remote content data store separate from the content management computing system, electronic content for the individual, wherein retrieving the electronic content comprises:

accessing, in the remote content data store, multiple instances of content, each instance of content including a respective set of psychographic dimensions, each psychographic dimension of the respective set of psychographic dimensions associated with a respective threshold psychographic dimension value;

comparing, for each instance of content, each of the threshold psychographic dimension values to psychographic dimension values of the particular psychographic profile; and determining, for each instance of content of the multiple content, a content similarity score based on a number of psychographic dimension values of the psychographic profile that exceed corresponding threshold psychographic dimension values associated with the instance of content, wherein the retrieved electronic content for the individual comprises an instance of content from the multiple instances of content having a greatest content similarity score;

selecting, from a remote template data store separate from the content management computing system, the template associated with the particular psychographic profile group;

determining that the electronic content has a second set of color data for graphical elements of the electronic content and a second font applied to the text;

based on the template, altering the electronic content by changing the graphical elements to be displayed with the first set of color data rather than the second set of color data and changing the second font applied to the text within the electronic content into the first font; and causing a web server or email server to transmit the electronic content, as altered, to the user device.

* * * * *